F. C. BROCK.
SEAT COVER FOR AUTOMOBILES.
APPLICATION FILED AUG. 3, 1917.

1,303,019.

Patented May 6, 1919.

Frederick C. Brock
Inventor;
Edwin P. Corbett
Attorney.

UNITED STATES PATENT OFFICE.

FREDERICK C. BROCK, OF COLUMBUS, OHIO, ASSIGNOR TO THE J. P. GORDON COMPANY, OF COLUMBUS, OHIO, A CORPORATION OF OHIO.

SEAT-COVER FOR AUTOMOBILES.

1,303,019.

Specification of Letters Patent.

Patented May 6, 1919.

Application filed August 3, 1917. Serial No. 184,247.

*To all whom it may concern:*

Be it known that I, FREDERICK C. BROCK, a citizen of the United States of America, residing at Columbus, in the county of Franklin and State of Ohio, have invented certain new and useful Improvements in Seat-Covers for Automobiles, of which the following is a specification.

My invention relates to seat covers for automobiles and has particular reference to that portion of the so called seat covers which is applied to and covers the back and arms of the seat of an automobile, offering reasonable protection for the clothes of an automobilist. Hitherto, this unit of a seat cover has been made in one piece and I have noted that, at the points of juncture between the back and arm pieces, the covering never closely fits the cushion. It may be too loose and therefore wrinkled; although, it is more frequently too tight and therefore held away from the cushion. In the former case, it is unsightly. In the latter case it defeats the very purpose of the back cushion by its tautness and a tearing away of the covering at some point is likely to result.

It is often desirable to apply the brakes of automobiles with great force and rapidity. In this case the operator is forced back in the seat with a force substantially equal to the pressure applied to the brake pedal. This pressure is not evenly applied to the seat and its cover, but is localized in a relatively small area. The location may vary with individual operators, but the principle remains the same. My invention is directed to provide a seat covering which will closely fit the yieldable cushions, and yet which will yield as such local pressure is applied to the cushion. Furthermore, when such pressure is released the covering will return to a normal or initial position.

My invention consists in providing a back and arm covering which automatically conforms to the cushion throughout. I preferably attain this by providing a multiple piece covering member whose conformative nature is amplified by a bottom fastening means calculated to automatically assume proper position as conforming adjustments occur. In the form specifically described in this application, my back and arm covering is formed in three pieces, one for each arm and an overlapping piece for the back. Each piece is adapted to be secured at its upper edge and its lower edge is provided with loops through which run cords in turn passed through screw eyes in a manner to be described.

A specific form of my invention is shown in the accompanying drawings wherein similar characters of reference designate corresponding parts.

Figure 1:
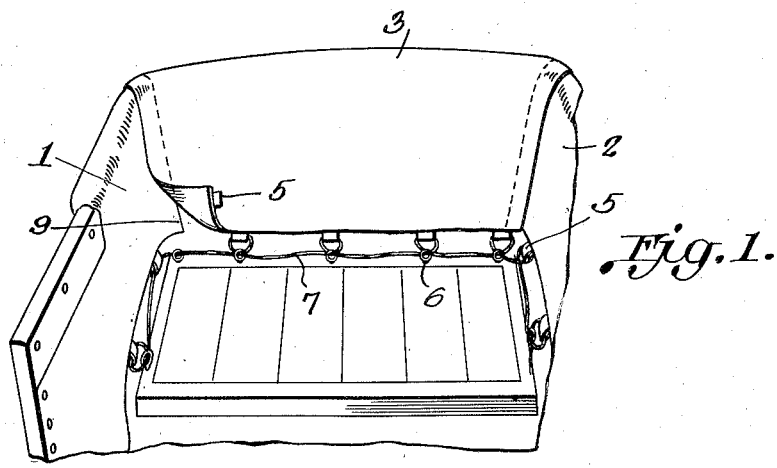
Figure 1 is a perspective view of an automobile seat with my invention applied, the seat cushion being removed and one corner of the back piece being upturned to illustrate the independence of the back piece from the arm pieces.
Figure 2:
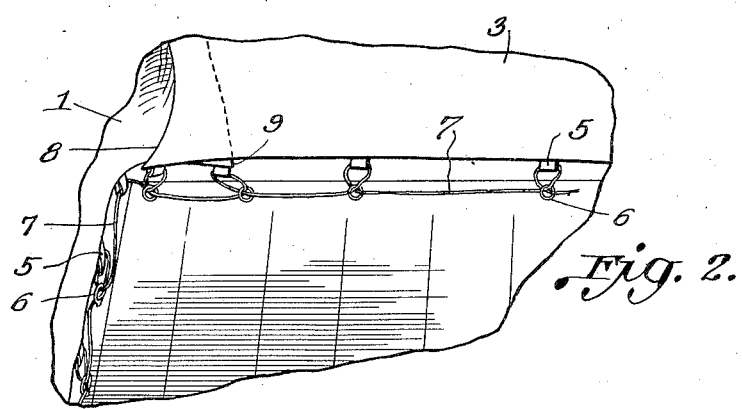
Fig. 2 is a perspective view of a portion of the structure shown in Fig. 1 and showing the manner of application of my improved covering.
Figure 3:
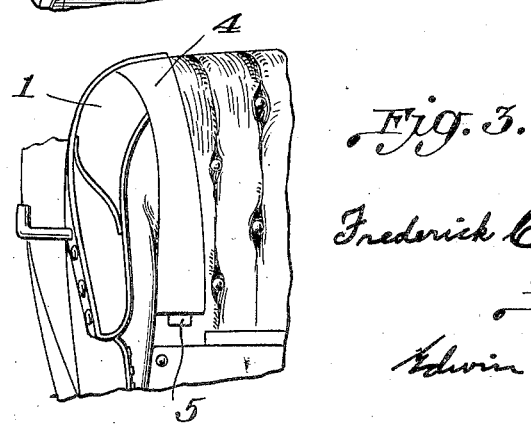
Fig. 3 is a detail showing an arm piece applied.

In the drawings, the covering is shown as comprising arm pieces 1 and 2 and an overlapping back piece 3. The upper edges of all three of these pieces may be secured in various ways to the body of the automobile. In the form shown, they are secured by stud and socket fasteners.

The arm pieces 1 and 2 are also desirably secured along their forward edges by stud and socket fasteners and they extend rearwardly until they well overlap the angles between the arms which they cover and the back. An extended flap 4 is desirably utilized for this purpose. The back piece 3 widens out toward its upper edge and is preferably of such expanse that its vertical edges well overlap the flap 4 of each arm piece. Since the back piece and the arm pieces are not connected together, they may lie back into close contact with the cushions at all points, yielding with these cushions when pressure is applied and then returning naturally with the cushions to normal position.

It is considered preferable that each of the three pieces be provided with a separate fastening means at its lower edge, although this is not absolutely essential. Along the lower edge of each piece immediately above the main seat structure are loops 5 which may be of the material from which the pieces are formed.

These loops 5 are connected to screw eyes 6 by means of ropes or cords 7 which are desirably passed through each loop 5 and twice through each screw eye 6. The connection is firm and yet there will be sufficient sliding action to permit of the proper relative movement between the pieces 1, 2 and 3 as they conform to the cushions. It will be obvious that I have provided a multi-piece covering for the backs of automobile seats and that such covering will automatically conform to initial variations in automobile models and the subsequent variations in response to pressures applied to the cushions.

Attention is called to the fact that in the present showing the lower corners of the back piece are stretched toward the arm pieces as at 8, while the lower rear corners of the arm pieces are stretched toward the back piece as at 9.

Having thus described my invention what I claim is:

1. A covering for the backs of automobile seats comprising pieces whose adjacent vertical edges have a yieldable overlapping relation to permit a spreading yielding action under applied pressure and return to normal upon removal of such pressure.

2. A covering for the backs of automobile seats comprising a multi-piece structure, means for independently and rigidly securing the top of each of said pieces adjacent the top of the seat back, and means for independently lacing the bottom of each of said pieces adjacent the bottom of the seat back, said pieces being in overlapping relation and independently yieldable to conform to the back of the seat when local pressure is applied thereto.

3. A covering for the resilient backs of automobile seats comprising a multi-piece structure, means for independently and rigidly securing the top of each of said pieces adjacent the top of the seat back, and means for independently and slidably securing the bottom of each of said pieces adjacent the bottom of the seat back, said pieces being in overlapping relation and independently yieldable to conform to the resilient back of the seat when local pressure is applied thereto or removed therefrom.

In testimony whereof I hereby affix my signature.

FREDERICK C. BROCK.